I. W. BOULD.
DRIVING AND STEERING MECHANISM FOR POWER OPERATED VEHICLES.
APPLICATION FILED MAY 15, 1911.

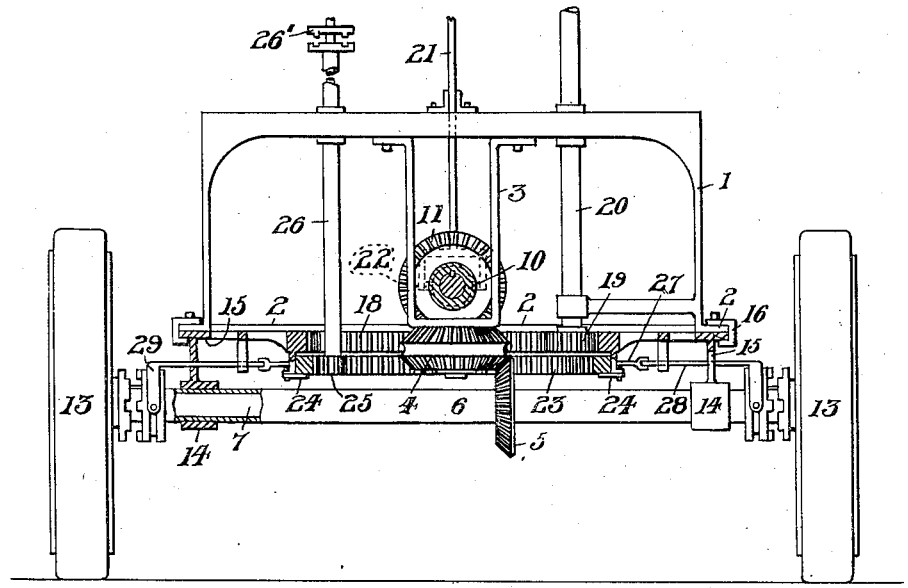

1,023,804.

Patented Apr. 23, 1912.

2 SHEETS—SHEET 2.

WITNESSES:

INVENTOR.
Iram W. Bould,
BY
H.W. Stevenson
ATTORNEY.

UNITED STATES PATENT OFFICE.

IRAM W. BOULD, OF PITTSBURGH, PENNSYLVANIA.

DRIVING AND STEERING MECHANISM FOR POWER-OPERATED VEHICLES.

1,023,804.  Specification of Letters Patent.  Patented Apr. 23, 1912.

Application filed May 15, 1911. Serial No. 627,135.

*To all whom it may concern:*

Be it known that I, IRAM W. BOULD, a citizen of the United States, residing at Pittsburgh, in the county of Allegheny and State of Pennsylvania, have invented a certain new and useful Improvement in Driving and Steering Mechanism for Power-Operated Vehicles, of which the following is a specification.

The fundamental object of my invention involves the provision of a new and useful improvement in steering apparatus for use on vehicles of the engine or motor driven class, whereby the front axle, while coupled up with the engine or motor and under power from the same, can be turned by the operator at any desired angle to the rear axle. In this way a vehicle equipped with my invention can be turned within a very short radius either with or without the front axle being under power, which fact will be of great advantage to heavily loaded trucks when obliged to turn in a narrow space.

My invention further has for its object the construction and arrangement of parts shown in the accompanying drawings, which illustrate one embodiment thereof, reserving the right however to make alterations and amendments in the detail form of construction which will be within the scope of the claims appended hereto.

Figure 3:
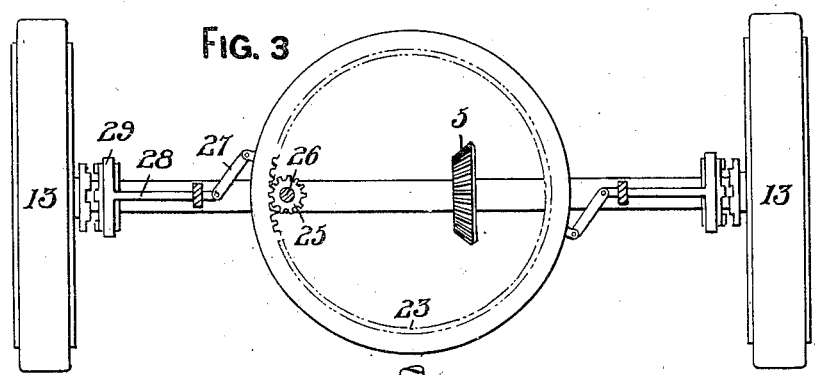
Figure 4:
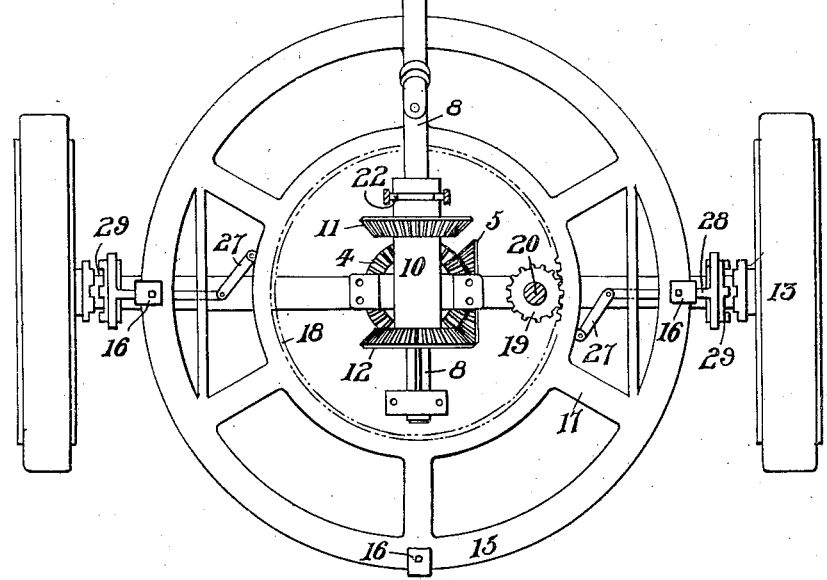

Referring then to said drawings, Figure 1 shows an elevation of my steering and regulating apparatus as applied to the axle of a vehicle. Fig. 2 is a side elevation showing shiftable gearing for operating the axle shaft as coupled with a power driven shaft. Fig. 3 shows a plan view of the mechanism I employ for engaging and disengaging the wheel clutch, and Fig. 4 is a similar view of the driving and steering mechanism.

Secured to the under frame of the vehicle in any suitable manner, and in conjunction with the ordinary arrangement of springs, not shown, is a supporting frame 1, the lower extremity thereof being formed with an outwardly projecting flange portion 2; which describes a complete circle of predetermined diameter. Secured to this frame 1, midway of the vertically disposed side pieces, is a stirrup or U-shaped member 3, to the lower extremity of which is operatively mounted a two-faced bevel gear 4, the lower face of which meshes with a single bevel gear 5 mounted on and fixed to the tubular shaft 6. This said shaft receives the axle 7, which has unimpeded movement therethrough, and permits free action of the wheels when not coupled up and under power.

The driving shaft 8, suspended by hangers 9—9, operates through the stirrup 3, and carries a clutch operated collar 10 keyed to said shaft, on said collar being mounted two fixed bevel gears 11 and 12 respectively, the bevel portions facing each other, as shown, and are adapted to alternately engage or disengage the upper beveled face of the gear 4. This shaft 8 can be driven from either the front or rear, as indicated by its broken formation, but when driven from the rear an angularly disposed universal connection 8' is preferably utilized for clearance purposes; as will appear further on in the description.

Positioned around the shaft 6, adjacent to each wheel 13, is a collar 14, which supports a circular T-shaped table member 15, the horizontal flange of which is intended to closely engage and bear against the under side of the flange 2, suitable clip members 16 being employed to unite these two elements 2 and 15 in operative position. Radiating inwardly from this said circular portion 15 are a plurality of integral spokes or strengthening members 17, their inner extremities carrying a circular toothed rack 18. Meshing with this said rack is a pinion 19 mounted at the lower extremity of a vertically disposed steering shaft 20, adequately supported by the frame 1, and operatable from a convenient point within the vehicle. A lever operated rod 21, also at the ready convenience of the operator, serves to control the clutch 22, which acts to reciprocally present either the gear 12 to drive the shaft 6 in one direction, or else the gear 11 to drive said shaft in an opposite direction.

Directly underneath the circular rack 18 is positioned in close proximity thereto a similar shaped rack 23, of slightly less diameter, that is operatively suspended from said rack 18 by suitable hangers 24, which permits of a free rotary movement of said rack 23.

A pinion 25 meshing with the teeth of the rack 23, carried at the lower extremity of an operating shaft 26 supported through the frame 1, and provided at any suitable point with a releasable clutch 26', serves as a means for rotating said rack 23, which, acting in conjunction with the links 27, rods 28, and clutch 29, affords a means for coupling the wheels with the power driven shaft 6, or for uncoupling said wheels from the power drive whenever it is desired they should run free.

The respective elements being assembled approximately as shown and described the operation of my mechanism will be as follows: The operator by hand manipulation of the steering shaft 20 causes the pinion 19 to revolve in mesh with the rack 18, and by so doing rotates the table 15 against the fixed bearing flanged member 2, and in turn causes the elements 14 to draw the tubular shaft 6 and axle 7 in the same arc of travel described by the said table 15. By this means the front axle and wheels can be caused to perform a complete circle or assume any degree of angle to its normal horizontal position. While this turning movement is in progress the bevel gear 5 is free to travel in mesh against the lower face of the gear 4, thereby performing the function of a rotary pivotal point while the driving shaft 8 is under power from the engine or motor; not shown. While the machine is in a passive condition the engine or motor may be allowed to run free without affecting the driving mechanism by a partial movement of the clutch lever 21, which acts to slide the collar 10 and disengage both gears 11 and 12 from mesh with the gear 4. Then if the vehicle is to be moved forward or backward the steering mechanism, as above described, is brought into service, which transmits power to the tubular shaft 6, but does not affect the axle 7 and wheels 13 until the next succeeding operation. This consists in bringing the clutch 26' into union with the shaft 26, then by rotating said shaft the pinion 25 moves the rack 23 a slight distance sufficient to cause the links 27 and rods 28 to operate and throw the two parts of the clutch 29 into mesh with each other, in which position the wheels will be brought under direct power of the driving mechanism.

A power driven vehicle equipped with my steering mechanism can be turned in a comparatively small space, and at the same time be under direct drive from the engine or motor, which will be a great advantage in heavily loaded trucks where it is necessary to make a short turn. It is also possible in conjunction with my invention to drive all four wheels, thus deriving the maximum of efficiency and power from the engine or motor.

What I claim as new, and desire to secure by Letters Patent, is:

1. A driving and steering mechanism for self propelled vehicles involving suitable frame work; a circular flanged bearing member carried by the said frame; a tubular shaft for housing the axle; a circular table supported by the axle shaft adapted for rotation against the flanged bearing member; means for holding said table and flanged portion in operative position; a bevel gear mounted over the axle shaft; a double faced horizontally disposed bevel gear suitably supported for rotation the lower face of which meshes with the first mentioned bevel gear on the axle shaft and the upper face adapted to mesh with reversing bevel gears mounted on the power shaft; clutch means for forcing the last mentioned gears alternately into or out of engagement with the double faced gear; a circular inner toothed rack member carried by the said table surrounding the gearing; a shaft operated pinion meshing with said rack for revolving the table and turning the axle at any desired angle; a second inner toothed rack suitably supported for rotation beneath the first mentioned rack; a shaft operated pinion meshing with the said second rack to rotate same; and clutch means, involving suitable connections acting in conjunction with the movement of the said second rack, to throw the wheels into or out of engagement with the power driven shaft.

2. A driving and steering mechanism for self propelled vehicles involving suitable frame work; a circular flanged bearing member carried by the said frame; a tubular shaft for housing the axle; a circular table supported by the axle shaft adapted for rotation against the flanged bearing member; means for holding said table and flanged portion in operative position; a bevel gear mounted over the axle shaft; a double faced horizontally disposed bevel gear suitably supported for rotation, the lower face of which meshes with the first mentioned bevel gear on the axle shaft, and the upper face adapted to mesh with reversing bevel gears slidably mounted on the power shaft; lever operated clutch means for forcing the last mentioned gears alternately into or out of engagement with the upper portion of the double faced gear; a circular inner toothed rack member carried by the said table surrounding the gearing; a shaft operated pinion meshing with said rack for revolving the table thereby turning the axle in any desired angle; a second inner toothed rack suitably supported for rotation beneath the first mentioned rack; a slidable clutch on the axle shaft to mesh with a fixed clutch carried by the wheel; links connecting said second rack and slidable clutch; and a shaft operated pinion meshing with the said second rack to rotate same and operate the wheel clutch.

3. A driving and steering mechanism for power vehicles involving suitable gearing; a tubular shaft for housing the axle; lever operated clutch means for controlling the direction of drive; a frame for housing the gearing involving a circular flanged bearing portion; a circular table supported by the axle shaft, adapted for rotation against the flanged bearing portion; means for holding said table and flanged portion in operative position; an interiorly positioned toothed rack carried by the table; a shaft operated pinion meshing with said rack for revolving the table and turning the axle; a second toothed rack suitably supported beneath the first mentioned rack adapted for rotation; a slidable clutch on the axle shaft to mesh with a fixed clutch carried by the wheel; links connecting said second rack and slidable clutch; and a shaft operated pinion meshing with said second rack to rotate same and operate the wheel clutch.

In testimony whereof, I affix my signature in the presence of two witnesses.

IRAM W. BOULD.

Witnesses:
A. E. FORTLAGE,
J. P. APPLEMAN.